No. 660,974. Patented Oct. 30, 1900.
W. G. SAYRS.
FRUIT PICKER.
(Application filed Feb. 7, 1900.)
(No Model.)
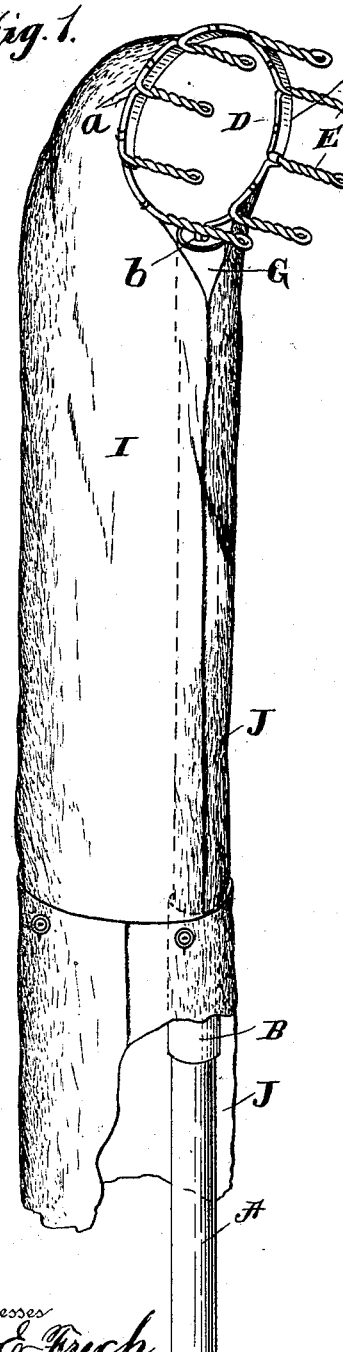
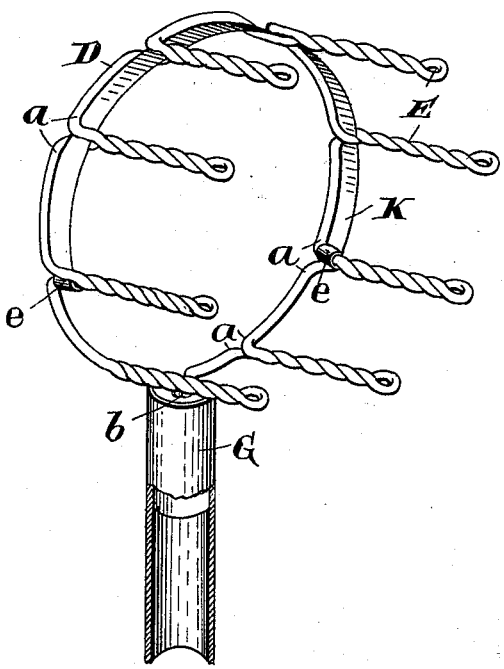
Witnesses
Geo. E. French.
B. L. Chadwell.
Inventor
William G. Sayrs
by
L. N. Evans
Attorney
THE NORRIS PETERS CO., PHOTO-LITHO., WASHINGTON, D. C.

UNITED STATES PATENT OFFICE.

WILLIAM G. SAYRS, OF BURNSIDE, ILLINOIS.

FRUIT-PICKER.

SPECIFICATION forming part of Letters Patent No. 660,974, dated October 30, 1900.

Application filed February 7, 1900. Serial No. 4,366. (No model.)

*To all whom it may concern:*

Be it known that I, WILLIAM G. SAYRS, a citizen of the United States, residing at Burnside, in the county of Hancock and State of Illinois, have invented certain new and useful Improvements in Fruit-Pickers, of which the following is a specification.

My invention relates to improvements in fruit-pickers, and pertains to a picker in which an adjustable handle is provided, carrying at one end a picking arrangement constructed as herein shown and described and a bag in communication with the picking device or arrangement into which the fruit falls and passes to the lower end of the handle, all of which will be fully described hereinafter and particularly referred to in the claims.

In the accompanying drawings, Figure 1 is a perspective view of a picker embodying my invention, the same being shown in an operative position. Fig. 2 is an enlarged detached perspective view of the picker-ring, showing its specific construction and the knife carried thereby.

The object of my invention is to provide a picker which is constructed of a single piece of wire with laterally-projecting twisted arms between which the stems of the fruit being picked passes and a knife which consists of a band held by the lower ends of the laterally-projecting twisted arms, whereby when it is necessary the stem of the fruit can be cut by a drawing pull upon the picker, the fruit picked to fall into a textile tube and be conveyed thereby to the lower end of the handle.

Referring now to the drawings, A is a sectional handle, the ends of the sections being united by metallic tubes or sockets B, whereby the handle may be lengthened or shortened, as may be required in the operation of the device.

The picker-ring D consists of a single piece of wire which is provided intermediate its ends with a plurality of laterally-projecting doubled and twisted portions E, which constitute a plurality of laterally-extending arms which serve as means for catching the fruit and to draw it from the tree. It will be noticed that the lower ends of these doubled and twisted arms extend in opposite directions, as indicated at *a*, and that these oppositely-extending portions serve to constitute a ring, as will be readily understood from the drawings. The ends *b* of this wire ring extend outward and into a suitable ferrule G, the said ferrule G adapted to detachably receive the upper end of the sectional handle A. A textile tube I has its upper end suitably connected with the picker-ring, and the tube extends downward, preferably inclosing the handle A, and the tube is made into sections J, adapted to be buttoned or hooked together, as illustrated, whereby the tube may be made of a length to correspond with the length of the sectional and adjustable handle A.

For the purpose of facilitating the picking of the fruit I provide the picking-ring with a knife, which is arranged in a novel and cheap manner. This knife K consists of a band, as illustrated, the said band being preferably composed of steel. The band passes between the lower ends of the double portions which constitute the laterally-extending arms of the ring, the lower edge of the knife resting upon the upper edges of the ring portions *a*, situated between the said arms, and which serve to hold the knife against removal in the opposite direction by the twisted portions of the arms. By means of this construction it will be seen that a knife is provided between the several picker-arms, whereby when desired the knife can be used as a means for cutting the stem of the fruit, and thus facilitate the picking thereof. The ends of the knife K are formed into hooks or eyes *e*, which embrace one stem of the double arms, and thus serve to prevent an endwise movement of the knife.

A picker of the above description is simple and cheap to construct and yet very efficient in its operation.

Having thus described my invention, what I claim, and desire to secure by Letters Patent, is—

1. A picker-ring composed of a single piece of wire having laterally-extending doubled portions constituting picker-arms, and a metallic band passing between the two members constituting the picker-arms thereof, the upper edge of the band constituting a knife situated between the said arms, substantially as described.

2. A picker-ring composed of a single piece of wire having a plurality of laterally-extending doubled portions constituting picker-arms, and a knife extending between the lower ends of the two members of the doubled portions and held in position thereby to constitute a knife between the said arms, substantially as described.

3. A picker-ring composed of a single piece of wire having a plurality of doubled laterally-extending twisted portions constituting picker-arms, and a knife composed of a metallic band extending between the two members of the doubled and twisted portions, one edge of the knife resting upon the upper edge of the ring between the said arms for holding the knife against movement in one direction, and the knife being held against movement in the other direction by the twisted portions of the arms, substantially as described.

4. A picker-ring composed of a single piece of wire having a plurality of laterally-extending doubled portions constituting picker-arms, and a knife composed of a strip of metal with its outer edge sharpened, the said strip extending between the two members constituting the doubled portions, the knife having its ends provided with hooks adapted to embrace the stems of the doubled portions, substantially as described.

In testimony whereof I affix my signature, in presence of two witnesses, this 1st day of February, 1900.

WILLIAM G. SAYRS.

Witnesses:
ALBERT SALISBURY,
MARSHALL GROTTS.